(12) United States Patent
Hedtke (10) Patent No.: US 7,913,566 B2
(45) Date of Patent: Mar. 29, 2011

(54) INDUSTRIAL PROCESS DEVICE UTILIZING MAGNETIC INDUCTION

(75) Inventor: Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 171 days.

(21) Appl. No.: 11/439,095

(22) Filed: May 23, 2006

(65) Prior Publication Data

US 2007/0273496 A1 Nov. 29, 2007

(51) Int. Cl.
*G01H 11/00* (2006.01)
*G01N 29/00* (2006.01)

(52) U.S. Cl. .......................................... 73/649; 73/579

(58) Field of Classification Search .................. 73/649, 73/579, 659, 660, 861.355, 861.356, 861.357, 73/861.22, 861.23, 861.12; 702/104–105, 702/45, 55, 69
See application file for complete search history.

(56) References Cited

U.S. PATENT DOCUMENTS

| | | | |
|---|---|---|---|
| 2,883,489 A | 4/1959 | Eadie, Jr. et al. | 335/148 |
| 3,232,712 A | 2/1966 | Stearns | 23/255 |
| 3,612,851 A | 10/1971 | Fowler | 362/30 |
| 3,633,053 A * | 1/1972 | Peters | 310/15 |
| D225,743 S | 1/1973 | Seltzer | D10/102 |
| 3,885,432 A | 5/1975 | Herzl | 73/861.22 |
| 3,964,296 A | 6/1976 | Matzuk | 73/67.5 |
| 4,005,319 A | 1/1977 | Nilsson et al. | 310/8.3 |
| 4,083,031 A | 4/1978 | Pharo, Jr. | 367/135 |
| 4,084,155 A | 4/1978 | Herzl | 340/870.39 |
| 4,116,060 A | 9/1978 | Frederick | 73/861.22 |
| 4,237,454 A * | 12/1980 | Meyer | 340/682 |
| 4,255,964 A | 3/1981 | Morison | 73/24.01 |
| 4,292,769 A * | 10/1981 | Maag et al. | 451/9 |
| 4,355,536 A | 10/1982 | McShane et al. | 73/633 |
| 4,361,045 A * | 11/1982 | Iwasaki | 73/654 |
| 4,370,890 A | 2/1983 | Frick | 73/18 |
| 4,383,443 A | 5/1983 | Langdon | 73/290 |
| 4,383,801 A | 5/1983 | Pryor | 416/17 |
| 4,389,895 A | 6/1983 | Rud, Jr. | 73/724 |
| 4,390,321 A | 6/1983 | Langlois et al. | 417/15 |
| 4,393,711 A | 7/1983 | Lapides | 73/592 |
| 4,423,634 A | 1/1984 | Audenard et al. | 73/587 |
| 4,446,741 A * | 5/1984 | Sirokorad et al. | 73/654 |

(Continued)

FOREIGN PATENT DOCUMENTS

CH 672 368 A5 11/1989

(Continued)

OTHER PUBLICATIONS

"Invitation to Pay Additional Fees" PCT/US2004/031678.

(Continued)

*Primary Examiner* — Helen C. Kwok
(74) *Attorney, Agent, or Firm* — Westman, Champlin & Kelly, P.A.

(57) ABSTRACT

A process device for coupling to an industrial process for use in monitoring or controlling the process includes a device housing configured to physically couple to the industrial process. A coil of wire is mounted to the housing and a magnet is configured to move through the coil of wire. The relative movement of the magnet is responsive to vibrations in the industrial process. Such relative movement induces an electrical current in the coil of wire. Electrical circuitry in the housing includes an input to receive the electrical current from the coil of wire.

32 Claims, 5 Drawing Sheets

U.S. PATENT DOCUMENTS

| | | | |
|---|---|---|---|
| 4,448,062 A | 5/1984 | Peterson et al. | 73/86 |
| 4,475,047 A | 10/1984 | Ebert, Jr. | 307/66 |
| 4,476,853 A | 10/1984 | Arbogast | 126/578 |
| 4,536,753 A | 8/1985 | Parker | 340/566 |
| 4,590,466 A | 5/1986 | Wiklund et al. | 340/870.28 |
| 4,641,529 A | 2/1987 | Lorenzi et al. | 73/601 |
| 4,696,191 A | 9/1987 | Claytor et al. | 73/600 |
| 4,704,607 A | 11/1987 | Teather et al. | 340/825.07 |
| 4,749,993 A | 6/1988 | Szabo et al. | 340/870.31 |
| 4,860,232 A | 8/1989 | Lee et al. | 364/571.04 |
| 4,878,012 A | 10/1989 | Schulte et al. | 324/60 |
| 4,895,031 A * | 1/1990 | Cage | 73/861.355 |
| 4,977,480 A | 12/1990 | Nishihara | 73/724 |
| 4,979,125 A * | 12/1990 | Kwun et al. | 702/35 |
| 4,982,412 A | 1/1991 | Gross | 377/6 |
| 5,014,543 A | 5/1991 | Franklin et al. | 73/40.5 |
| 5,015,949 A * | 5/1991 | Koch et al. | 324/207.25 |
| 5,025,202 A | 6/1991 | Ishii et al. | 320/101 |
| 5,047,990 A | 9/1991 | Gafos et al. | 367/6 |
| 5,094,109 A | 3/1992 | Dean et al. | 73/718 |
| D331,370 S | 12/1992 | Williams | D10/46 |
| 5,170,671 A | 12/1992 | Miau | 73/861.22 |
| 5,223,763 A | 6/1993 | Chang | 310/339 |
| D345,107 S | 3/1994 | Williams | D10/46 |
| 5,313,831 A | 5/1994 | Beckman | 73/204.24 |
| 5,329,818 A | 7/1994 | Frick et al. | 73/708 |
| 5,369,674 A | 11/1994 | Yokose et al. | 376/245 |
| 5,372,041 A * | 12/1994 | Yoshida et al. | 73/514.31 |
| 5,495,769 A | 3/1996 | Broden et al. | 73/18 |
| 5,497,661 A | 3/1996 | Stripf et al. | 73/611 |
| 5,506,757 A | 4/1996 | Brorby | 361/796 |
| 5,554,809 A | 9/1996 | Tobita et al. | 73/700 |
| 5,606,513 A | 2/1997 | Louwagie et al. | 702/138 |
| 5,637,802 A | 6/1997 | Frick et al. | 73/724 |
| 5,642,301 A | 6/1997 | Warrior et al. | 364/571.02 |
| 5,650,943 A | 7/1997 | Powell et al. | 702/51 |
| 5,656,782 A | 8/1997 | Powell, II et al. | 73/756 |
| 5,665,899 A | 9/1997 | Willcox | 731/1.63 |
| 5,682,476 A | 10/1997 | Tapperson et al. | 370/225 |
| 5,705,978 A | 1/1998 | Frick et al. | 340/511 |
| 5,756,898 A | 5/1998 | Diatschenko et al. | 73/592 |
| 5,793,963 A | 8/1998 | Tapperson et al. | 395/200.31 |
| 5,796,006 A | 8/1998 | Bellet et al. | 73/658 |
| 5,803,604 A | 9/1998 | Pompei | 374/181 |
| 5,811,201 A | 9/1998 | Skowronski | 429/17 |
| 5,851,083 A | 12/1998 | Palan | 403/337 |
| 5,854,993 A | 12/1998 | Grichnik | 702/54 |
| 5,870,695 A | 2/1999 | Brown et al. | 702/138 |
| 5,872,494 A | 2/1999 | Palan et al. | 333/252 |
| 5,874,676 A | 2/1999 | Maki, Jr. | 73/579 |
| 5,899,962 A | 5/1999 | Louwagie et al. | 702/138 |
| 5,929,372 A | 7/1999 | Oudoire et al. | 136/208 |
| 5,954,526 A | 9/1999 | Smith | 439/136 |
| 5,956,663 A | 9/1999 | Eryurek | 702/183 |
| 5,978,658 A | 11/1999 | Shoji | 455/66 |
| 6,017,143 A | 1/2000 | Eryurek et al. | 706/23 |
| 6,069,560 A * | 5/2000 | Larsson | 340/540 |
| 6,079,276 A | 6/2000 | Frick et al. | 73/18 |
| 6,119,047 A | 9/2000 | Eryurek et al. | 700/28 |
| 6,127,739 A | 10/2000 | Appa | 290/55 |
| 6,199,018 B1 | 3/2001 | Quist et al. | 702/34 |
| 6,282,247 B1 | 8/2001 | Shen | 375/285 |
| 6,289,735 B1 | 9/2001 | Dister et al. | 73/579 |
| 6,295,875 B1 | 10/2001 | Frick et al. | 73/718 |
| 6,326,764 B1 | 12/2001 | Virtudes | 320/101 |
| 6,332,112 B1 | 12/2001 | Shukunami et al. | 702/56 |
| 6,338,283 B1 | 1/2002 | Blazquez Navarro et al. | 73/865.8 |
| 6,360,277 B1 | 3/2002 | Ruckley et al. | 709/250 |
| 6,367,328 B1 | 4/2002 | Gorman et al. | 73/592 |
| 6,378,364 B1 | 4/2002 | Pelletier et al. | 73/152.47 |
| 6,385,972 B1 | 5/2002 | Fellows | 60/517 |
| 6,405,139 B1 | 6/2002 | Kicinski et al. | 702/33 |
| 6,441,747 B1 | 8/2002 | Khair et al. | 340/870.16 |
| 6,449,574 B1 * | 9/2002 | Eryurek et al. | 702/99 |
| 6,480,699 B1 | 11/2002 | Lovoi | 455/41.2 |
| 6,493,689 B2 | 12/2002 | Kotoulas et al. | 706/23 |
| 6,497,222 B2 | 12/2002 | Bolz et al. | 123/476 |
| 6,508,131 B2 | 1/2003 | Frick | 73/756 |
| 6,530,259 B1 | 3/2003 | Kelly et al. | 73/23.2 |
| 6,567,006 B1 | 5/2003 | Lander et al. | 340/605 |
| 6,574,515 B1 | 6/2003 | Kirkpatrick et al. | 700/19 |
| 6,584,847 B1 | 7/2003 | Hirose | 73/579 |
| 6,597,997 B2 | 7/2003 | Tingley | 702/34 |
| 6,601,005 B1 | 7/2003 | Kavaklioglu et al. | 702/104 |
| 6,637,267 B2 | 10/2003 | Fiebelkorn et al. | 73/587 |
| 6,661,220 B1 | 12/2003 | Glehr | 324/207.17 |
| 6,711,446 B2 | 3/2004 | Kirkpatrick et al. | 700/19 |
| 6,722,185 B2 | 4/2004 | Lawson et al. | 73/40 |
| 6,727,812 B2 | 4/2004 | Sauler et al. | 340/511 |
| 6,747,573 B1 | 6/2004 | Gerlach et al. | 340/870.21 |
| 6,751,560 B1 | 6/2004 | Tingley et al. | 702/51 |
| 6,774,814 B2 | 8/2004 | Hilleary | 340/870.07 |
| 6,778,100 B2 | 8/2004 | Schempf | 340/870.07 |
| 6,792,259 B1 | 9/2004 | Parise | 455/343.1 |
| 6,839,546 B2 | 1/2005 | Hedtke | 455/67.11 |
| 6,843,110 B2 | 1/2005 | Deane et al. | 73/114.35 |
| 6,880,403 B1 * | 4/2005 | Shimada et al. | 73/652 |
| 6,891,838 B1 | 5/2005 | Petite et al. | 370/401 |
| 6,904,295 B2 | 6/2005 | Yang | 455/522 |
| 6,907,383 B2 | 6/2005 | Eryurek et al. | 702/183 |
| 6,910,332 B2 | 6/2005 | Fellows | 60/520 |
| 6,920,789 B2 * | 7/2005 | Sakai | 73/587 |
| 6,951,133 B2 * | 10/2005 | Passarelli, Jr. | 73/643 |
| 6,976,503 B2 | 12/2005 | Ens et al. | 137/552 |
| 6,984,899 B1 | 1/2006 | Rice | 290/44 |
| 7,010,294 B1 | 3/2006 | Pyotsia et al. | 455/420 |
| 7,010,459 B2 | 3/2006 | Eryurek et al. | 702/182 |
| 7,023,205 B1 * | 4/2006 | Krupp | 324/239 |
| 7,035,773 B2 * | 4/2006 | Keyes et al. | 702/188 |
| 7,036,983 B2 | 5/2006 | Green et al. | 374/179 |
| 7,040,179 B2 | 5/2006 | Drahm et al. | 73/861.356 |
| 7,058,542 B2 | 6/2006 | Hauhia et al. | 702/183 |
| 7,073,394 B2 | 7/2006 | Foster | 73/861.22 |
| 7,114,516 B2 | 10/2006 | Ito | 137/487.5 |
| 7,116,036 B2 | 10/2006 | Balasubramaniam et al. | 310/322 |
| 7,137,307 B2 * | 11/2006 | Huybrechts et al. | 73/861.12 |
| 7,173,343 B2 | 2/2007 | Kugel | 290/1 R |
| 7,197,953 B2 | 4/2007 | Olin | 73/866.5 |
| 7,233,745 B2 | 6/2007 | Loechner | 398/128 |
| 7,254,518 B2 * | 8/2007 | Eryurek et al. | 702/183 |
| 7,258,024 B2 * | 8/2007 | Dimarco et al. | 73/861.22 |
| 7,262,693 B2 | 8/2007 | Karchnia et al. | 340/508 |
| 7,271,679 B2 | 9/2007 | Lundberg et al. | 333/24 |
| 7,290,450 B2 * | 11/2007 | Brown et al. | 73/579 |
| 7,301,454 B2 | 11/2007 | Seyfang et al. | 340/539.26 |
| 7,321,846 B1 * | 1/2008 | Huisenga et al. | 702/183 |
| 7,329,959 B2 | 2/2008 | Kim et al. | 290/2 |
| 7,579,947 B2 | 8/2009 | Peluso | 340/539.26 |
| 2001/0025349 A1 | 9/2001 | Sharood et al. | 713/340 |
| 2002/0029130 A1 | 3/2002 | Eryurek et al. | 702/183 |
| 2002/0029808 A1 | 3/2002 | Friend et al. | 137/551 |
| 2002/0065631 A1 | 5/2002 | Loechner | 702/188 |
| 2002/0078752 A1 | 6/2002 | Braunling et al. | 73/627 |
| 2002/0095520 A1 | 7/2002 | Wettstein et al. | 709/253 |
| 2002/0097031 A1 | 7/2002 | Cook et al. | 323/273 |
| 2002/0105968 A1 | 8/2002 | Pruzan et al. | 370/465 |
| 2002/0148236 A1 | 10/2002 | Bell | 62/3.3 |
| 2002/0163323 A1 | 11/2002 | Kasai et al. | 323/284 |
| 2003/0030537 A1 | 2/2003 | Kogure | 340/3.5 |
| 2003/0032993 A1 | 2/2003 | Mickle et al. | 607/60 |
| 2003/0042740 A1 | 3/2003 | Holder et al. | 290/1 A |
| 2003/0079553 A1 | 5/2003 | Cain et al. | 73/861.27 |
| 2003/0097521 A1 | 5/2003 | Pfandler et al. | 711/103 |
| 2003/0143958 A1 | 7/2003 | Elias et al. | 455/73 |
| 2003/0171827 A1 | 9/2003 | Keyes, IV et al. | 700/19 |
| 2003/0199778 A1 | 10/2003 | Mickle et al. | 600/509 |
| 2003/0204371 A1 | 10/2003 | Sciamanna | 702/183 |
| 2004/0025593 A1 | 2/2004 | Hashimoto et al. | 73/643 |
| 2004/0086021 A1 | 5/2004 | Litwin | 374/120 |
| 2004/0093174 A1 | 5/2004 | Lander | 702/56 |
| 2004/0142733 A1 | 7/2004 | Parise | 455/572 |
| 2004/0159235 A1 | 8/2004 | Marganski et al. | 95/116 |
| 2004/0199681 A1 | 10/2004 | Hedtke | 710/37 |
| 2004/0203434 A1 | 10/2004 | Karschnia et al. | 455/67.11 |

| | | | | | | |
|---|---|---|---|---|---|---|
| 2004/0211456 | A1 | 10/2004 | Brown et al. ............... 136/243 | JP | 02 067794 | 3/1990 |
| 2004/0214543 | A1 | 10/2004 | Osone et al. ............. 455/197.2 | JP | 3-118424 | 5/1991 |
| 2004/0242169 | A1 | 12/2004 | Albsmeier et al. ............ 455/91 | JP | 06 199284 A | 7/1994 |
| 2004/0259533 | A1 | 12/2004 | Nixon et al. .............. 455/414.1 | JP | 8-247076 | 9/1996 |
| 2005/0017602 | A1 | 1/2005 | Arms et al. .................. 310/339 | JP | 11-036981 | 2/1999 |
| 2005/0023858 | A1 | 2/2005 | Bingle et al. ................... 296/76 | JP | 11-215867 | 8/1999 |
| 2005/0029236 | A1 | 2/2005 | Gambino et al. ........ 219/121.69 | JP | 003051894 | 2/2003 |
| 2005/0046595 | A1 | 3/2005 | Blyth ........................... 340/908 | JP | 2003134261 | 5/2003 |
| 2005/0072239 | A1* | 4/2005 | Longsdorf et al. .............. 73/649 | JP | 2004021877 | 1/2004 |
| 2005/0099010 | A1 | 5/2005 | Hirsch ......................... 290/422 | JP | 2005-72080 | 3/2005 |
| 2005/0115601 | A1 | 6/2005 | Olsen et al. .................. 136/212 | RU | 1813916 | 7/1993 |
| 2005/0118468 | A1 | 6/2005 | Adams et al. .................. 429/22 | RU | 2 131 934 C1 | 6/1999 |
| 2005/0122653 | A1 | 6/2005 | McCluskey et al. ............ 361/92 | WO | WO 88/05964 | 8/1988 |
| 2005/0130605 | A1 | 6/2005 | Karschnia et al. ........... 455/90.3 | WO | WO 91/11029 | 7/1991 |
| 2005/0134148 | A1 | 6/2005 | Buhler et al. ................. 310/339 | WO | WO 95/07522 | 3/1995 |
| 2005/0164684 | A1 | 7/2005 | Chen et al. .................. 455/414.1 | WO | WO 99/53286 | 10/1999 |
| 2005/0182501 | A1 | 8/2005 | Franchuk et al. ............... 700/81 | WO | WO 03/023536 | 3/2003 |
| 2005/0201349 | A1 | 9/2005 | Budampati .................... 370/342 | WO | WO 03/089881 | 10/2003 |
| 2005/0208908 | A1 | 9/2005 | Karschnia et al. ......... 455/127.1 | WO | WO 2004/059139 | 7/2004 |
| 2005/0222698 | A1 | 10/2005 | Eryurek et al. .................. 700/90 | WO | WO 2004/082051 | 9/2004 |
| 2005/0276233 | A1 | 12/2005 | Shepard et al. .............. 370/254 | WO | WO 2004/094892 | 11/2004 |
| 2005/0281215 | A1 | 12/2005 | Budampati et al. ........... 370/328 | WO | WO 2005/086331 | 9/2005 |
| 2005/0289276 | A1 | 12/2005 | Karschnia et al. ............ 710/305 | WO | WO 2005/060482 | 7/2007 |
| 2006/0002368 | A1 | 1/2006 | Budampati et al. ........... 370/351 | WO | WO 2008/098583 | 8/2008 |
| 2006/0022555 | A1 | 2/2006 | Balasubramaniam et al. ............................... 310/339 | | | |

OTHER PUBLICATIONS

"Notification of Transmittal of the International Search Report and the Written Opinion" PCT/US2004/022736.

U.S. Appl. No. 10/675,014, filed Sep. 30, 2003; titled "Process Device With Vibration Based Diagnostics".

U.S. Appl. No. 10/850,828, filed May 21, 2004; entitled "Wireless Power and Communication Unit for Process Field Devices".

"Notification of Transmittal of the International Search Report" PCT/US00/14798.

Invitation to Pay Additional Fee and Partial Search Report for PCT/US2007/011428, dated Oct. 8, 2008.

Notification of Transmittal of the International Search Report and the Written Opinion of the International Searching Authority, dated Dec. 17, 2008, for PCT/US2007/011428.

Notification of Transmittal of the Int'l Search Report and the Written Opinion of the Inter'l Searching Authority, dated Dec. 17, 2008, for PCT/US2007/011428.

Third Office Action from Chinese patent application No. 200580014212.4, dated Dec. 19, 2008.

The Official Communication in Application No. 05746241.8 filed May 5, 2005.

Notification on Results of Examining the Invention for Patentability from Russian patent App No. 2006145434, filed May 5, 2005.

USA & Metric Thread Standards http://www.carrlane.com/catalog/index.cfm/29425071FOB221118070C1C513906103E0B05543B0B0120090-83C3B285357474A2D020609090C0015312A36515F554A5B.

The International Search Report and Written Opinion in Application No. PCT/US2006/035728, filed Sep. 13, 2006.

International Search Report and Written Opinion of Application No. PCT/US2005/015848, file May 5, 2005.

Hgh Power Single PSE Controller with Internal Switch, *Linear Technology LTC4263-1*, pp. 1-20.

Fourth Office Action from Chinese patent Application No. 200580014212.4, dated Jul. 24, 2009.

Official Letter regarding Mexican Patent Application No. PA/A/2006/013488, dated Jun. 25, 2009.

Decision on Refusal to Grant for Russian Patent Application No. 2006145434, filed May 5, 2005.

First Examination Report for Indian Patent Application No. 3589/CHENP/2006, dated Apr. 17, 2009.

Official Action from Russian patent application 2008116682, dated Jan. 16, 2009.

First Office Action for Chinese patent application 200680015575.4, filed Jun. 27, 2006.

Second Office Action from Chinese patent application 200580006438.X, dated Apr. 10, 2009.

Third Office Action from Chinese patent application 200500142124, dated Dec. 19, 2008.

| | | | |
|---|---|---|---|
| 2006/0036404 | A1 | 2/2006 | Wiklund et al. ............... 702/183 |
| 2006/0063522 | A1 | 3/2006 | McFarland ..................... 455/423 |
| 2006/0092039 | A1 | 5/2006 | Saito et al. ............... 340/825.37 |
| 2006/0128689 | A1 | 6/2006 | Gomtsyan et al. ........ 514/217.01 |
| 2006/0148410 | A1 | 7/2006 | Nelson et al. ............... 455/67.11 |
| 2006/0181406 | A1 | 8/2006 | Petite et al. ..................... 340/521 |
| 2006/0227729 | A1 | 10/2006 | Budampati et al. ........... 370/278 |
| 2006/0274644 | A1 | 12/2006 | Budampati et al. ........... 370/216 |
| 2006/0274671 | A1 | 12/2006 | Budampati et al. ........... 370/254 |
| 2006/0277000 | A1 | 12/2006 | Wehrs ........................... 702/183 |
| 2006/0287001 | A1 | 12/2006 | Budampati et al. ........ 455/552.1 |
| 2007/0006528 | A1 | 1/2007 | Diebold et al. ............. 48/197 R |
| 2007/0030235 | A1 | 2/2007 | Kolavennu .................... 370/252 |
| 2007/0030832 | A1 | 2/2007 | Gonia et al. .................. 370/338 |
| 2007/0039371 | A1 | 2/2007 | Omata et al. ....................... 73/9 |
| 2007/0046480 | A1 | 3/2007 | Stein ............................. 340/601 |
| 2007/0054630 | A1 | 3/2007 | Scheible et al. ............. 455/90.3 |
| 2007/0135867 | A1 | 6/2007 | Klosterman et al. ............ 607/60 |
| 2007/0188053 | A1 | 8/2007 | Stark ............................. 310/339 |
| 2007/0228737 | A1 | 10/2007 | Hirsch ............................ 290/42 |
| 2007/0229255 | A1 | 10/2007 | Loechner ...................... 340/540 |
| 2007/0233283 | A1 | 10/2007 | Chen ............................. 700/17 |
| 2007/0237137 | A1 | 10/2007 | McLaughlin ................. 370/389 |
| 2007/0275755 | A1 | 11/2007 | Chae et al. .................... 455/557 |
| 2008/0010600 | A1 | 1/2008 | Katano .......................... 715/748 |
| 2008/0054645 | A1 | 3/2008 | Kulkarni et al. ................ 290/52 |
| 2008/0083446 | A1 | 4/2008 | Chakraborty et al. ........ 136/205 |
| 2008/0088464 | A1 | 4/2008 | Gutierrez ...................... 340/606 |
| 2008/0123581 | A1 | 5/2008 | Wells et al. ................... 370/315 |
| 2008/0141769 | A1 | 6/2008 | Schmidt et al. ............ 73/204.19 |
| 2009/0195222 | A1 | 8/2009 | Lu .................................... 322/3 |
| 2009/0260438 | A1 | 10/2009 | Hedtke .......................... 73/579 |

FOREIGN PATENT DOCUMENTS

| | | |
|---|---|---|
| CN | 1251953 | 5/2000 |
| CN | 1 442 822 | 3/2003 |
| CN | 1429354 A | 7/2003 |
| CN | 1442822 A | 9/2003 |
| DE | 3340834 A1 | 5/1985 |
| DE | 35 03 597 C1 | 7/1986 |
| DE | 3503597 * | 7/1986 |
| DE | 201 07 112 U1 | 7/2001 |
| DE | 101 04 582 A1 | 10/2001 |
| EP | 0 524 550 A1 | 1/1993 |
| EP | 0 697 586 A2 | 2/1996 |
| EP | 1 202 145 | 5/2002 |
| EP | 1 293 853 | 3/2003 |
| EP | 1 482 568 A2 | 12/2004 |
| GB | 1 397 435 A | 6/1975 |
| GB | 2 145 876 A | 4/1985 |
| GB | 2 320 733 A | 7/1998 |
| JP | 59-075684 | 4/1984 |
| JP | 60-125181 | 7/1985 |

Second Official Action from Russian Patent Application No. 2006145434, filed May 5, 2005.
Office Action from U.S. Appl. No. 11/028,486, filed Jan. 3, 2005.
Examination Report of the European Patent Office in Application No. 05724190.3, filed Mar. 2, 2005.
$2^{nd}$ Office Action from Chinese Patent App No. 200580014212.4 filed May 5, 2005.
The International Search Report and Written Opinion in Appln No. PCT/US2005/021757, filed Jun. 21, 2005.
The Official Communication in Application No. 2006145434, filed May 5, 2005.
Notification of Transmittal of the International Search Report or the Declaration- PCT/US03/10403.
"Wireless R&D Aims to Boost Traffic", by M. Moore, *InTech with Industrial Computing*, Feb. 2002, 3 pgs.
"System Checks Faraway Machines' Health", by J. Strothman, *InTech with Industrial Computing*, Feb. 2002, 1 pg.
"Wireless Management Toolkit XYR 5000", by Honeywell International Inc., Phoenix, Arizona, 3 pgs., Oct. 2003.
"Wireless Analog Input Transmitters XYR 5000", by Honeywell International Inc., Phoenix, Arizona, 4 pgs., Oct. 2003.
"Quad Analog Output Module Installation and User's Manual", by Honeywell International Inc., Phoenix, Arizona, pp. Ii, iii, iv and 1-12, Dec. 2003.
Notification of Results of Examining the Invention for Patentability from Russian Patent Application No. 2006145434, filed May 5, 2005.
Second Office Action from Chinese Patent Application No. 200580014212.4, filed May 5, 2005.
First Office Action from Chinese Patent Application No. 200580006438.X, filed Mar. 2, 2005.
Examiner's Consultation from European Patent Application No. 05724190.3, filed Mar. 2, 2005.
First Office Action from Chinese Patent Application No. 2005800142124, filed May 5, 2005.
Office Action from Chinese Patent Application No. 200500142125, filed May 21, 2004.
Official Communication from Application No. 05746241.8, filed May 5, 2005.
Notification of Transmittal of Int'l Search Report and Written Opinion in PCT/US2007/011428, dated Dec. 17, 2008.
"Wireless Dual Analog Input Interface Transmitter Installation and User's Manual", by Honeywell International Inc., Phoenix, Arizona, pp. Ii-vi and 7-43, Dec. 2003.
"XYR 5000 Wireless Dual Analog Input Interface, Model Selection Guide", by Honeywell International Inc., Phoenix, Arizona, Dec. 2003.
"Wireless Measure, Monitor & Control", by Accutech, 4 pgs. May 2003.
"Wireless Instrumentation, Multi-Input Field Unit", by Accutech, 2 pgs., Dec. 2003.
"Quad Analog Output Module", by Accutech, 1 pg. Dec. 2003.
3 Pages from Website www.chemicalprocessing.com, Apr. 2004.
4 Pages from Website http://content.honeywell.com/imc/eznews/eznews0403/news.htm, 2004.
Examiner's consultation for European Patent Application 05 724 190.3, filed Mar. 2, 2005.
Notification of Transmittal of the International Search Report and the Written Opinion, PCT/US2007/019636, dated Oct. 1, 2008.
Chinese Office Action from Chinese Serial No. CN2010050700456580, dated May 12, 2010.
International Search Report and Written Opinion from Serial No. PCT/US2009/062152., Jun. 9, 2010.
Office Action of related U.S. Appl. No. 11/645,821 dated Apr. 13, 2010.

\* cited by examiner

INDUSTRIAL PROCESS DEVICE UTILIZING MAGNETIC INDUCTION

BACKGROUND OF THE INVENTION

The present invention relates to industrial process devices of the type used to couple to industrial process control and monitoring systems.

In industrial settings, control systems are used to monitor and control inventories of industrial and chemical processes, and the like. Typically, a control system performs these functions using field devices distributed at key locations in the industrial process and coupled to the control circuitry located in a control room by a process control loop. The term "field device" refers to any device that performs a function in a distributed control or process monitoring system, including all devices used in the measurement, control and monitoring of industrial processes.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others. Other field devices include a control element and are used to control the industrial process. Examples of such process devices include valve controllers, valve position controllers, heater controllers, pump controllers, etc.

In many process installations, process devices experience vibrations. The vibrations can occur during normal operation of the process. Additionally, certain types of failures can cause the process device to experience unusual vibrations, for example a failing pump, a loose bracket, etc.

SUMMARY

A process device for coupling to an industrial process for use in monitoring or controlling the process includes a device housing configured to physically couple to the industrial process. A coil of wire is mounted to the housing and a magnet is configured to move through the coil of wire. The relative movement of the magnet is responsive to vibrations in the industrial process. Such relative movement induces an electrical current in the coil of wire. Electrical circuitry in the housing includes an input to receive the electrical current from the coil of wire.

DETAILED DESCRIPTION

Figure 1:
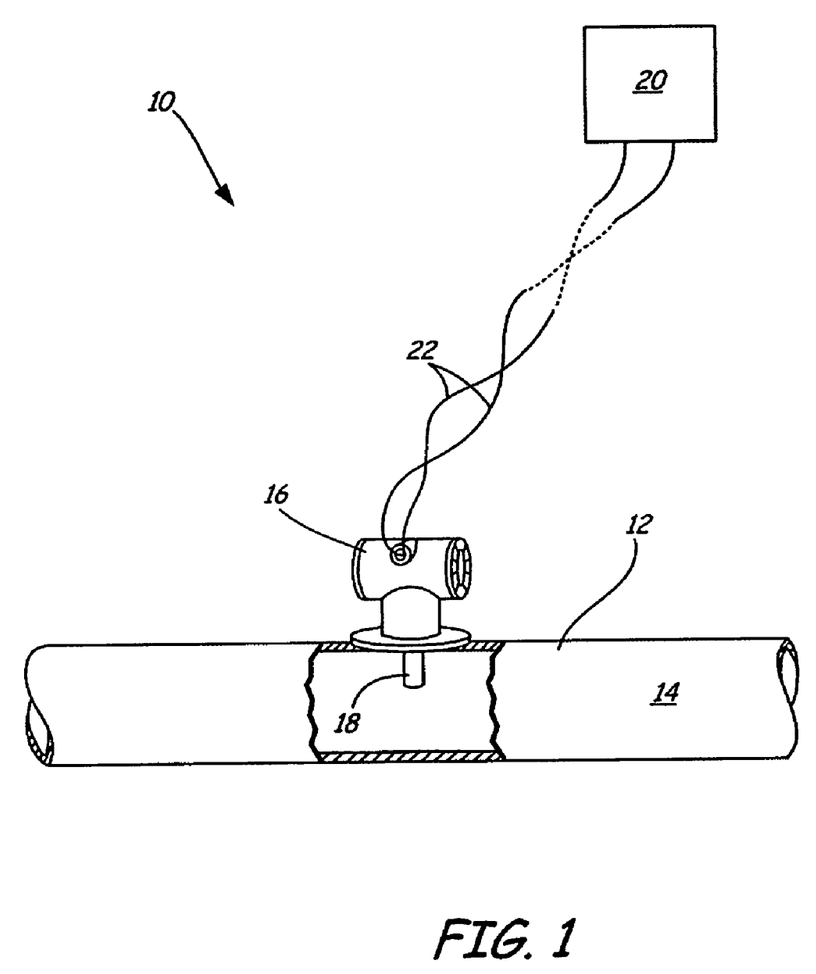
FIG. 1 is a simplified diagram of a process monitoring or control system for monitoring or controlling an industrial process.

FIG. 1 is a simplified diagram of an industrial process controller monitoring system 10 including a process device 16 in accordance with the present invention. As discussed in more detail below, process device 10 includes an electrical coil and a moveable magnet configured to move in response to vibrations in system 10 and thereby generate an electrical current.

Process device 16 is coupled to process piping 12 which is configured to carry a process fluid 14. A process interface element 18 is configured to couple to the process and is used for input or output to the process device 16. For example, if the process device is configured as a process control transmitter, interface element 18 can comprise some type of a process variable sensor such as a pressure sensor, flow sensor, temperature sensor, etc configured to sense a process variable. On the other hand, if process device 16 is configured as a process control device, interface element 18 can be, for example, a valve, a heater, etc., which is used to control the process. Process device 16 couples to remotely located circuitry such as control room 20 over a process control loop 22. Process control loop 22 is illustrated as a two wire process control loop and can comprise, for example, a process control loop configured to operate in accordance with industrial standards. Example industrial standards include 4-20 mA protocols, the HART® protocol, FieldBus protocols, and others.

Figure 2:
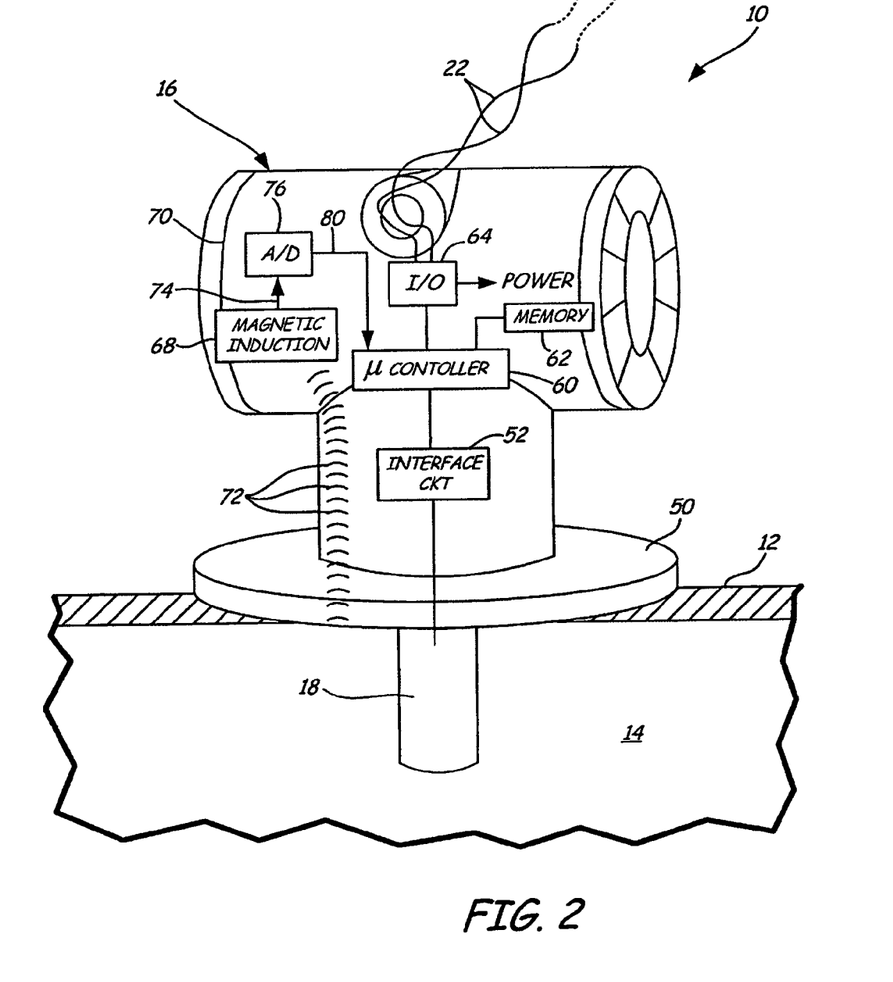
FIG. 2 shows a cutaway view and simplified block diagram of a process device including magnetic induction circuitry for use in performing diagnostics.

FIG. 2 is a simplified cross-sectional view showing one example embodiment of the present invention in which process device 16 couples to process piping through a process coupling 50 such as a flange or the like. Field device 16 includes interface circuitry 52 which couples to process interface 18. When configured as a transmitter, interface circuitry 52 can perform initial processing and operate with a process variable sensor. Similarly, when configured as a process controller, interface circuitry 52 is used to control the process interface 18. Field device 16 includes a microcontroller 60 which operates in accordance with programming instructions stored in memory 62. Microcontroller 60 also couples to I/O circuitry 64 which itself couples to process control loop 22. In some configurations, I/O circuitry 64 also provides a power output which is used to power some or all of the circuitry of process device 16.

Magnetic induction circuitry 68 is mounted in a device housing 70 of the process device 16. Magnetic induction circuitry 68 is physically coupled to the housing 70 such that vibrations 72 emanating from the industrial process 10 are received by magnetic induction circuitry 68. In the configuration of FIG. 2, magnetic induction circuitry 68 provides an electrical output signal 74 to an analog to digital converter 76. The analog to digital converter 76 receives the output signal 74 and provides a digitized signal 80 to the microcontroller 60. The microcontroller 60 can process the digitized signal as appropriate.

In one example configuration, microcontroller 60 monitors the amplitude, spectral content and/or signature (time and/or frequency) of the vibration signal 72. The signal 72 can be compared against known signals which are representative of nominal operation of the process 10. Nominal signal values such as amplitude, spectral content and/or signature can be stored, for example, in memory 62. As a further example, certain levels or thresholds in the output signal 74 may suggest specific failures in the process such as a broken or failing pump or bracket. Similarly, certain frequencies or groups of frequencies may suggest specific failures such as a failing or failed impeller. The vibration information can also be used to provide prognostic information related to the expected lifetime reduction in the process device due to the exposure to vibrations. If, during operation of the process device 16, the vibration signal 72 varies in a predetermined manner from the stored nominal values, microcontrollers 60 can make a determination that some type of event has occurred in the process which warrants further investigation. For example, the microcontroller 60 can provide an output signal indicative of component failure or potential failure that should be investigated by an operator. The information can also be used for other purposes such as to provide an indication of operation of other components in the industrial process such as a valve controller or the like. If the process coupling 50 has become loose, the vibration signal 72 will also change. In another example, if the vibration signal 72 should suddenly decrease or even disappear completely, this can be an indication that the process 10 has improperly shut down or is in an undesirable state.

Figure 3:
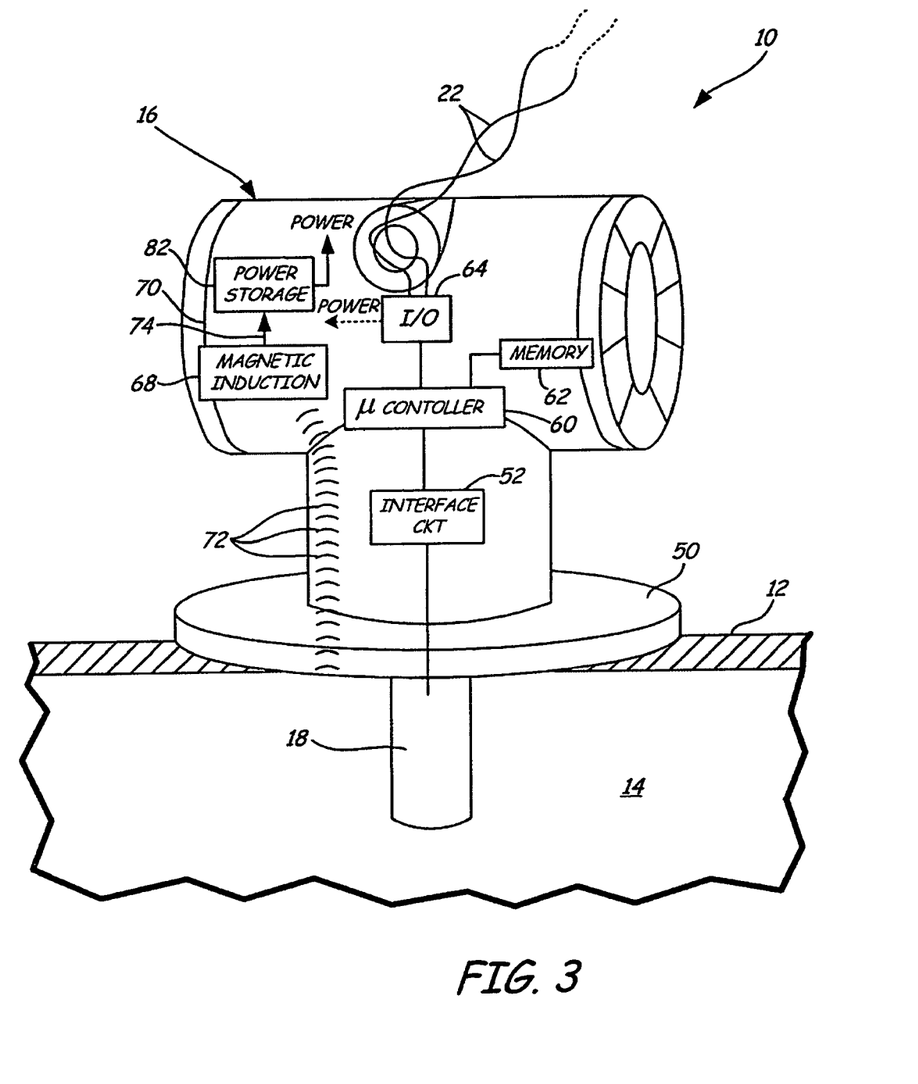
FIG. 3 shows a cutaway view and simplified block diagram of a process device including magnetic induction circuitry for use in generating power for the process device.

FIG. 3 is another simplified block diagram of process device 16 showing another example configuration of the present invention. In FIG. 3, elements which are similar to those shown in FIG. 2 have retained their numbering. In the configuration of FIG. 3, the vibration signal 72 is received by magnetic induction circuitry 68. The current output signal 74 from magnetic induction circuitry 68 is provided to a power storage circuitry 82. Power storage circuitry 82 can be any appropriate device for storing electrical power and can include, for example, an electrical capacitor and rectifying circuitry, a battery, etc., used to store energy from magnetic induction circuitry 68. Power storage circuitry 82 provides a power output signal which can be used to power process device 16. In such a configuration, I/O circuitry 64 may not be required to provide a power output signal. Further, in some configurations process device 16 is configured to operate over a wireless connection and I/O circuitry 64 is used for wireless communication. Power storage circuitry 82 can provide all of the power for process device 16, or can provide supplemental or backup power to the device 16.

Figure 4:
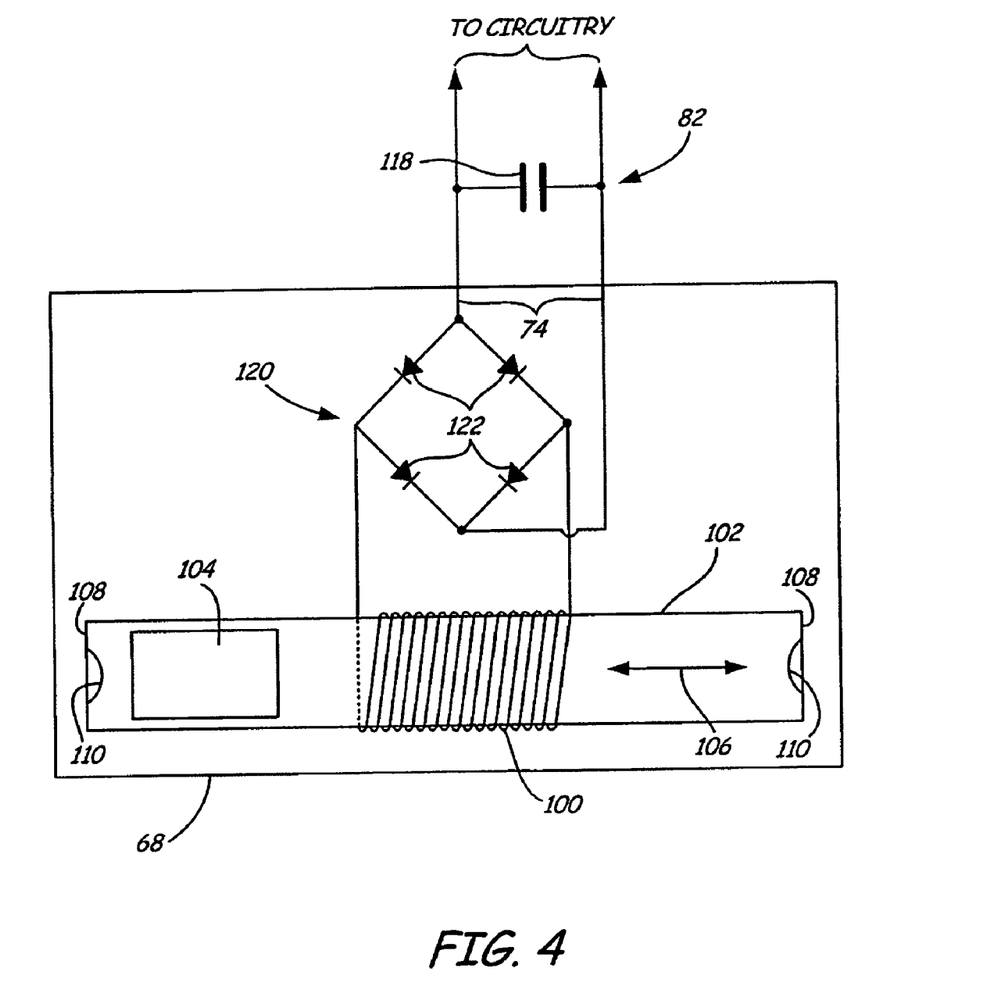
FIG. 4 is an electrical schematic diagram showing the magnetic induction circuit in greater detail.

FIG. 4 is a simplified electrical schematic diagram showing magnetic induction circuitry 68 in greater detail. Magnetic induction circuitry 68 includes a coil of wire 100 wound around a tube 102. Preferably, the wire has a relatively thin diameter to allow a great number of windings around tube 102. However, the wire of coil 100 should have a sufficiently low electrical resistance to carry the electrical current generated by magnetic induction. A slidable permanent magnetic 104 is carried in tube 100 and can move in the direction indicated by arrows 106 between ends 108 of tube 102. In accordance with Faraday's Principle of Magnetic Induction, the movement of magnet 104 passed the coil of wire 100 causes an electrical current to be generated in the coil of wire 100. This current is proportional to the speed of magnet 104 relative to coil 100. Magnet 104 is configured to move in response to the vibration signal 72 shown in FIGS. 2 and 3. Spring members 110 can be positioned at ends 108 of tube 102 to conserve energy in the movement of magnet 104 as the magnet 104 changes directions within tube 102. The spring members 110 can be of any appropriate configuration such as a coiled spring, elastomeric components, etc. In a related configuration, spring members can be alternatively, or in addition to, mounted on magnet 104. As it is the relative movement between magnet 104 and coil 100 that generates the electrical current, sleeve 102 can be configured to move in response to the vibration signal 72.

FIG. 4 also shows an example configuration for power storage circuitry 82 in the form of an electrical capacitor 118. The electrical current from coil 100 is an AC current. In such a configuration, the current from coil 100 should be rectified so that the capacitor 118 is charged with a DC current. Such rectification is performed by a bridge rectifier 120 comprising diodes 122. Capacitor 122 stores an electrical charge which can be used to power electrical circuitry within process device 16. Such a configuration is for use, for example, in the arrangement shown in FIG. 3. However, if the magnetic induction circuitry 68 is used for diagnostic purposes and the electrical current is provided to an analog to digital converter 76 such as shown in FIG. 2, rectification of the signal may not be necessary and the bridge rectifier 120 can be eliminated. With the elimination of bridge rectifier 120, coil 100 can be coupled directly to analog to digital converter 76. A resistor can be used to convert the electrical current into a voltage signal appropriate for application to analog to digital converter 76.

Although a single magnetic induction circuit 68 is illustrated, multiple circuits can be used. Further, the tubes 102 of multiple magnetic induction circuitry 68 are aligned along different axes such that movement in more than one axis will produce an electrical current.

In one configuration, the orientation of tube 102 is adjustable such that it can be aligned along an access of maximum movement. For example, in one configuration, a vibration sensor 160 is provided which is configured to identify the axis along which the process device 16 experiences the greatest amount of vibration energy. For example, sensor 160 can comprise a number of accelerometers arranged such that there outputs can be observed to identify the axis of maximum vibration. In a specific configuration, three accelerometers all extending at 90° to one another (i.e., extending in the X, Y and Z directions, respectively) can be used to identify vibrations in all directions. For example, sensor 160 can comprise a tri-axis accelerometer. Based upon the outputs from such accelerometers, the axis along which the process device experiences maximum vibration can be identified. The microprocessor 60 of the device (see, for example, FIGS. 2 and 3) can monitor the output from the accelerometers over a period of time. The accumulative vibrations can be determined over the selected time period and the axis of maximum vibration identified. In some configurations, the axis of maximum vibrations may be the most desirable axis along which to align the induction circuitry. For example, if the process device 16 only infrequently experiences extremely large vibrations in one direction, but more regularly experiences smaller vibrations in another direction, it may be preferable to align the induction circuitry to be the most sensitive to vibrations which occur more regularly, even though they are not the maximum amplitude experienced by the device. Based upon the selected criteria, the microprocessor 60 can provide an output to a local operator (for example over the process controller 22 or over a local display, for example one which is included in sensor 160). The output can provide information to the local operator instructing the local operator how the induction circuit 68 should be aligned based upon the vibrations sensed by sensor 160. Based upon the output, an operator can adjust the orientation of induction circuit 68 as desired. In another configuration, the induction circuitry 68 is arranged such that it aligns itself automatically along the most preferred axis. For example, the alignment can be automated based upon the output from sensor 160, or can be through a mechanical configuration in which the received vibrations cause the induction circuitry 68 to reorient itself along a preferred axis relative to the vibrations.

Although the present invention has been described with reference to preferred embodiments, workers skilled in the art will recognize that changes may be made in form and detail without departing from the spirit and scope of the invention. Although the embodiments of FIGS. 2 and 3 are illustrated separately, the magnetic induction circuitry can be used simultaneously for both diagnostics and well as power generation.

Figure 5:
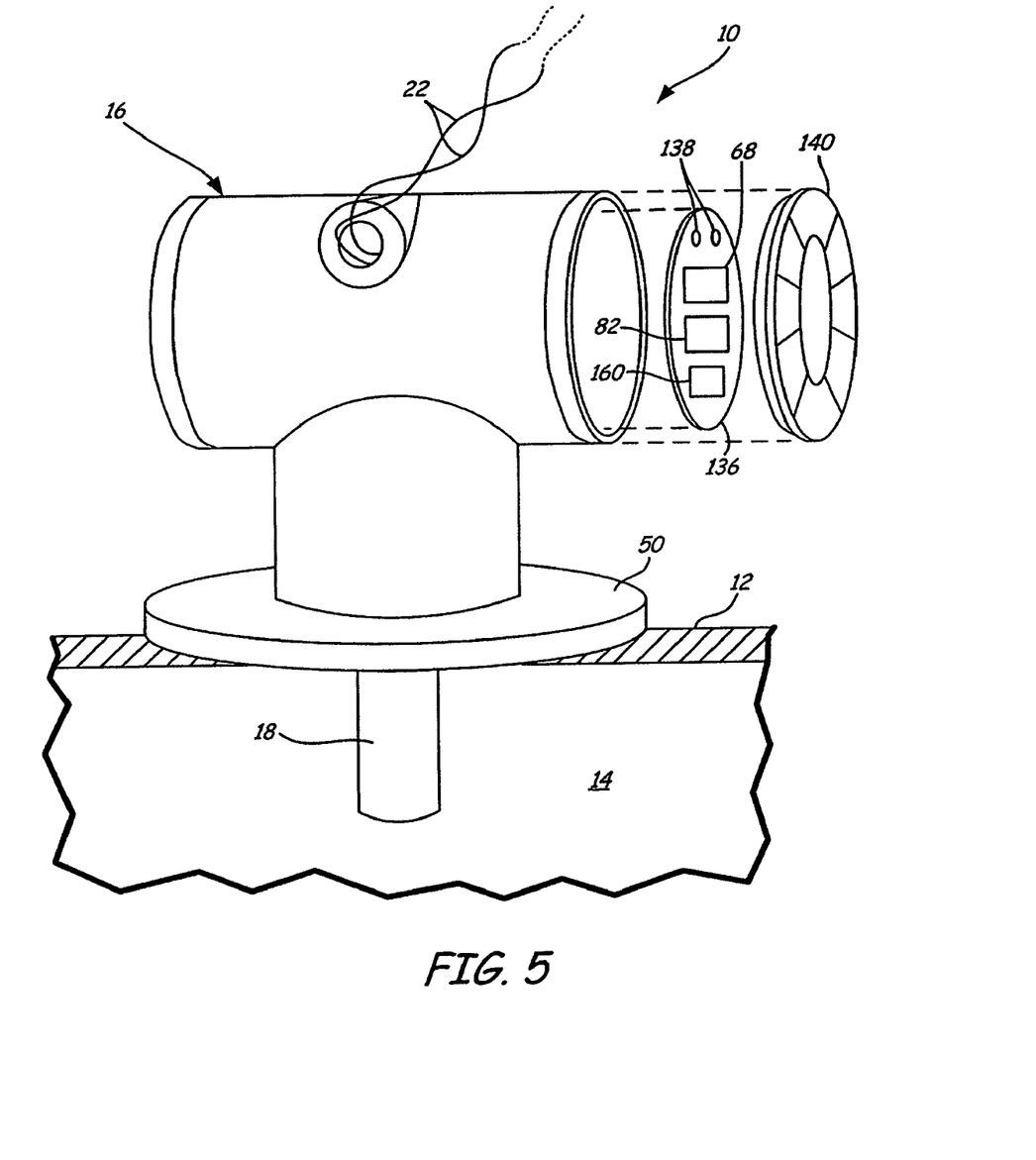
FIG. 5 is a exploded view of a process device showing another example configuration.

FIG. 5 is an exploded view of another configuration of process device 16 in which a terminal board 136 is included having terminals 138 for coupling to a two-wire process control loop 22. In the configuration of FIG. 5, the terminal board 136 is an optional component in which the magnetic induction circuitry 68 and optionally power storage circuitry 82 are carried on board 136. The board 136 can be selectively added to device 16 by unscrewing end cap 140.

Capacitor 118 can comprise, for example, a supercapacitor, also known as an ultracapacitor, which allows a significant amount of energy to be stored in a relatively small volume. In one configuration, the moveable magnet of the induction circuit can be oriented in such that it is aligned with the axis of maximum vibration. For example, a tri-axis accelerometer can be used in the transmitter to measure and indicate the axis of maximum vibration. In such a configuration, the tri-axis accelerometer can be a separate component temporarily coupled to process device 16, or can be included in circuitry, for example magnetic induction circuitry 68 of process device 16. The tri-axis accelerometer can provide an output for a installation personnel which indicates the axis of maximum vibration during normal operation. The installation personnel can then align the magnetic conduction circuitry such that the magnet experiences the maximum acceleration.

What is claimed is:

1. A process device for coupling to an industrial process for use in monitoring or controlling the process, comprising:
   a device housing configured to physically couple to the industrial process;
   a plurality of accelerometers, including:
      a coil of wire mounted to the housing;
      a magnet configured to move through the coil of wire along a path in response to vibrations in the industrial process thereby inducing an electrical current in the coil of wire;
      first and second springs arranged at opposed ends of the path configured to receive the magnet in a first direction and responsively urge the magnet in a second, opposed direction, the springs thereby configured to reverse a direction of movement of the magnet relative to the coil, the path having a path length and the magnet having a magnet length which is less than the path length whereby the magnet touches at most one of the first and second springs at any time;
   electrical circuitry in the housing having an input to receive the electrical current from the coil of wire, the electrical circuitry responsive to the electrical current from the vibrations; and
   a microcontroller coupled to the plurality of accelerometers configured to monitor outputs from the plurality of accelerometers over a period of time and identify an orientation of the magnet and coil of wire based upon a selected criteria, the microprocessor further configured to instruct an operator to orient the magnet and coil of wire through a local operator interface based upon the identified orientation.

2. The process device of claim 1 wherein the electrical circuitry is configured to diagnose operation of the industrial process based upon the electrical current.

3. The process device of claim 2 including an analog to digital converter having a digital output related to digitize the electrical current.

4. The process device of claim 2 wherein the microcontroller is further configured to perform diagnostics.

5. The process device of claim 2 wherein the microcontroller is configured to diagnose operation of the industrial process are based upon an amplitude of vibrations in the industrial process.

6. The process device of claim 2 wherein the microcontroller is configured to diagnose operation of the industrial process are based upon a frequency of vibrations in the industrial process.

7. The process device of claim 2 wherein the microcontroller is configured to diagnose operation of the industrial process are based upon a signature in the vibrations in the industrial process.

8. The process device of claim 2 wherein the microcontroller provides a diagnostic output based upon the vibrations and data stored in a memory.

9. The process device of claim 1 including a process interface configured to sense a process variable.

10. The process device of claim 1 wherein the process device includes a process interface configured to control the process.

11. The process device of claim 1 wherein the electrical circuitry includes power storage circuitry configured to store power from the electrical current from the coil of wire.

12. The process device of claim 11 wherein the power storage circuitry comprises a capacitor.

13. The process device of claim 11 including a rectifier to rectify the electrical current from the coil of wire.

14. The process device of claim 1 including a sensor configured to sense vibrations.

15. The process device of claim 14 wherein the orientation of the magnet is adjusted based upon the sensed vibrations.

16. The process device of claim 14 wherein the sensor comprises a three axis accelerometer.

17. The process device of claim 12 wherein the capacitor comprises a supercapacitor.

18. A method for sensing vibrations in a process device coupled to an industrial process of the type used in monitoring or controlling the industrial process, the method comprising:
   physically coupling a housing of the process device to the industrial process;
   receiving vibrations from the industrial process through the physical coupling;
   moving a magnet through a coil of wire along a path in response to the vibrations and generating an electrical current in the coil of wire;
   providing first and second opposed springs on opposed ends of the path arranged to receive the magnet in a first direction and urge movement of the magnet in a second opposed direction thereby reversing a direction of movement of the magnet relative to the coil, the path having a path length and the magnet having a magnet length which is less than the path length whereby the magnet touches at most one of the first and second springs at any time;
   providing the electrical current to circuitry of the process device, and responding with the circuitry to the electrical current;
   measuring vibrations with a vibration sensor;
   receiving measured vibrations from the vibration sensor and the coil of wire and responsively identifying a preferred orientation of the magnet and coil of wire based upon a selected criteria; and
   providing an output to an operator to orient the magnet and the coil of wire based upon the identified preferred orientation.

19. The method of claim 18 including diagnosing operation of the industrial process based upon the electrical current.

20. The method of claim 19 wherein the diagnosing is based upon an amplitude of vibrations.

21. The method of claim 19 wherein the diagnosing is based upon a frequency of vibrations.

22. The method of claim 19 wherein the diagnosing is based upon a signature in the vibrations.

23. The method of claim 19 wherein the diagnosing is based upon the vibrations and stored data.

24. The method of claim 18 including storing power storage based from the electrical current from the coil of wire.

25. The method of claim 18 including rectifying the electrical current from the coil of wire.

26. The method of claim 19 wherein sensing vibrations includes monitoring an output of a tri-axis accelerometer.

27. The process device of claim 1 wherein the electrical current generated from the vibrations is configured to completely power the process device.

28. The process device of claim 1 including wireless communication circuitry.

29. The process device of claim 28 wherein the wireless communication circuitry is powered with the electrical current generated from the vibrations.

30. The method of claim 18 including completely powering the process device with the electrical current generated from the received vibrations.

31. The method of claim 18 including communicating wirelessly with wireless communication circuitry.

32. The method of claim 31 wherein the wireless communication circuitry is powered with the electrical current generated from the received vibrations.

* * * * *